United States Patent
Harris et al.

(10) Patent No.: US 6,468,389 B1
(45) Date of Patent: Oct. 22, 2002

(54) UNDULATING MEMBRANE SURFACE FOR EVAPORATIVE PROCESSES

(76) Inventors: James Jeffrey Harris, 2592 Westridge Dr., Cameron Park, CA (US) 95682; James William Harris, 14080 Berry Rd., Golden, CO (US) 80401

( * ) Notice: Subject to any disclaimer, the term of this patent is extended or adjusted under 35 U.S.C. 154(b) by 0 days.

(21) Appl. No.: 09/436,565

(22) Filed: Nov. 9, 1999

(51) Int. Cl.[7] ............................. B01D 1/00; B01D 3/42
(52) U.S. Cl. .................. 159/47.1; 62/69; 62/259.4; 62/315; 210/737; 210/774; 210/640; 203/49; 203/100; 203/98; 159/901; 159/DIG. 28; 159/16.1; 202/175; 261/94; 261/128
(58) Field of Search .................. 203/100, 7, 98, 203/49, 10, 2; 159/DIG. 27, DIG. 28, 47.1, 901, 16.1, 44; 202/160, 175; 62/315, 259.4, 69, 89, 109; 261/94, 128, DIG. 3, DIG. 43; 210/774, 737, 634, 640

(56) References Cited

U.S. PATENT DOCUMENTS

| | | | |
|---|---|---|---|
| 3,634,128 A | * 1/1972 | Bolin | 99/205 |
| 3,654,092 A | 4/1972 | St. Clair | 202/174 |
| 3,820,343 A | 6/1974 | Shiraishi et al. | 62/305 |
| 4,304,738 A | 12/1981 | Nutter | 261/94 |
| 4,307,063 A | 12/1981 | O'Brien | 422/256 |
| 4,310,475 A | 1/1982 | Leva | 261/113 |
| 4,376,046 A | * 3/1983 | Deutsch | 210/176 |
| 4,581,183 A | 4/1986 | Lefevre | 261/94 |
| 4,666,564 A | * 5/1987 | Zeitsch | 203/100 |
| 4,746,437 A | * 5/1988 | Koseki et al. | 159/DIG. 27 |
| 4,778,569 A | * 10/1988 | Ostertag | 203/49 |
| 4,929,398 A | 5/1990 | Pedersen | 261/94 |
| 5,062,927 A | * 11/1991 | Stout | 203/89 |
| 5,100,548 A | * 3/1992 | Oelbermann | 210/228 |
| 5,236,663 A | 8/1993 | Alagy et al. | 422/211 |
| 5,437,819 A | 8/1995 | Hardison | 261/94 |

* cited by examiner

*Primary Examiner*—Virginia Manoharan
(74) *Attorney, Agent, or Firm*—Edwin H. Crabtree; Ramon L. Pizarro; Donald W. Mangolis (57) ABSTRACT

An evaporative process employing an undulating flexible membrane (4) as an evaporative surface onto which a vaporizing gas (2) such as, but not limited to, air, contacts a liquid solution (1, 5) such as, but not limited to, water, and evaporation occurs. The membrane (4) is supported (3) with sufficient laxity to permit wavelike undulating motion of the membrane brought about primarily by the evaporative airflow (2) itself. The differential flexing and motion of the undulating membrane (4) results in a breaking and peeling away of any normally fouling scaling or plugging solids which have precipitated or accumulated on the membrane surface (4). The undulation of the flexible membrane (4) thereby providing a self cleaning action. The self cleaning action of the membrane (4) assures successful application to evaporative processes with solutions (1, 5) which are prone to scaling, fouling, plugging or solutes buildup. The undulating membrane surfaces (4) can be employed for harvesting of solutes or concentration of solutions (6) in low temperature air (2) induced evaporative processes. Also, the undulating membrane (4) evaporative surface provides exemplary service for evaporative cooling processes by enabling the employment of low quality water (1, 5) as a coolant as well as by reducing or eliminating blow down discharge of concentrated liquid coolant.

21 Claims, 1 Drawing Sheet

Figure 1

UNDULATING MEMBRANE SURFACE FOR EVAPORATIVE PROCESSES

BACKGROUND—FIELD OF THE INVENTION

This invention relates to a self-cleaning, flexible film type of contacting surface media for use in evaporative processes that are prone to fouling, plugging or solids buildup.

BACKGROUND—DESCRIPTION OF PRIOR ART

Evaporative processes are fundamental in both nature and industry. Evaporative processes are used to provide cooling, chemical concentration and volume reduction. The reader is certainly familiar with the natural cooling processes of perspiration or spraying with water in the presence of a breeze. Industrial uses are demonstrated in cooling towers, atomizing environmental coolers, spray coolers, to name a few. Chemical concentration processes are exemplified in the manufacture of chemical concentrates, precipitates and salts. Food industries in which juices are concentrated and reduced in volume by means of evaporative processes are common. Sea water is evaporated and concentrated to precipitate sea salt for industrial, food, and pharmaceutical applications.

Evaporative processes operate by the conversion of a liquid into a vapor through the application of heat and sometimes pressure manipulation. Evaporation reduces the liquid volume and concentrates any entrained or dissolved solids. As the level of concentration increases, entrained solids form masses in the liquid and dissolved solids precipitate from the solution. In some instances the goal is to generate and collect the agglomerating, settling or precipitating solids. Evaporative precipitation processes attuned for the volumetric reduction, concentration and eventual precipitation and collection of the solutes from a solution are common. Such an example would be the harvesting of sea salt by means of evaporative ponds.

In many applications, however, the solids are not desired and can impart plugging and fouling problems to piping, heat exchangers and other evaporative process equipment. An example of such a situation is evaporative cooling processes wherein the buildup of precipitates can render evaporative cooling equipment useless.

Evaporation occurs with any liquid given the proper temperature and pressure environs. All liquids have an equilibrium pressure in the vapor surrounding the liquid that is established by the temperature of the liquid/vapor system An increase of the system temperature will generate vaporization with a consequential vapor pressure buildup. Similarly a reduction of system pressure will incite vaporization from the liquid which provides for regeneration of the pressure and, because of the heat required for such vaporization, the temperature of the system will fall. Equilibrium will be realized at a somewhat reestablished pressure and a lower temperature. The requisite pressure at a given temperature is the vapor pressure of the liquid, not the total pressure of the system. For a liquid such as water, the vaporization temperature at atmospheric pressure is 212° F. An open, heated container of water will vaporize at 212° F. The gases above the liquid water in such a container will be 100% water vapor at a vapor pressure of 1 atmosphere. If a vacuum pump were connected to the container and the pressure above the vaporizing water reduced, then the vaporization temperature would drop accordingly. Similarly, if the container were closed, the otherwise escaping water vapor will be contained and the pressure will build. As the pressure builds, the corresponding vaporization temperature also increases. In such a system, since the gas above the liquid water is entirely water vapor, the vapor and total pressure are equivalent. If a procedure is implemented to inject a gaseous contaminant, other than water vapor, into the vapor space in contact with the liquid water, then the vapor pressure and corresponding vaporization temperature would be reduced. The vapor pressure and volumetric dilution are essentially proportional. Liquid water, partially filling a closed container at a total pressure of one atmosphere, but in which the molal constituents of the gaseous phase above the liquid water is diluted to only one-half water vapor, will have a reduced vaporization temperature corresponding to a total pressure of only one-half atmosphere. This phenomenon is used to great advantage for the provision of low temperature evaporation and evaporative cooling.

Evaporative cooling applications employ airflow for dilution of water vapor in contact with liquid water. With sufficient air dilution, evaporative temperatures and consequentially liquid water temperatures can be brought very low. This process also can be employed to reduce the contacting air temperature. This low temperature water or the air cooled therein is consequentially used for cooling purposes. Evaporative cooling requires both adequate airflow, as well as sufficient water vapor to air contacting and consequential dilution, to be effective. The diluted water vapor must be in an equilibrium contact with the liquid water for the aspired low temperatures to be generated. The low temperature equilibrium occurs at the vapor to liquid interface. Thermal transfer between the liquid body and the vapor to liquid interface is necessary to provide cooling of the liquid body itself. Maximum cooling efficiency is therefore achieved by minimizing the distance of thermal transfer in the liquid body and by maximizing the surface area of the liquid body in contact with the airstream This is most efficiently accomplished by means of either breaking the liquid water into many small droplets and/or by providing a means for forming thin, high surface area liquid water films. Both these processes are used in evaporative technologies. Droplets are typically generated through nozzles and/or a myriad of splash inducing bars, referred to as splash bar fill, trays or panels, wherein water is introduced at a top of a series of these structures, is drawn gravitationally downward, impacting the bars and generating splash droplets. Film generating systems are also employed wherein water is introduced across a series of solid sheets, referred to as film fill or packing, forming thin, high surface area films as the water progresses downward. A version of this, wherein films are formed upon a wetted webbing system on which water dribbles through, is often used, particularly for airstream cooling and/or humidification purposes. In all cases, airflow is introduced through and in contact with the water droplets and films to provide the evaporative cooling effect. Water loss, resulting from evaporation, is compensated by recharge with additional clean water.

As stated earlier, evaporative processes are vulnerable to plugging and fouling in the presence of entrained and dissolved solids. Evaporative cooling equipment, especially the fill, is prone to fouling and scaling if poor quality water is employed. Fouling of the fill is usually counteracted by means of partial discharge and recharge with higher quality water. This process, in which the discharge is commonly referred to as the blow-down and the recharge as the makeup, generally includes some form of chemical treatment. The blow-down /makeup process provides a means for establishing and maintaining the water at a steady state level of sufficient quality to the minimize the fouling and scaling potential of the evaporating and concentrating water. In some circumstances, chemical treatment processes can be employed to further reduce the scaling, fouling and plugging potential of the water. These chemical treatment processes serve to reduce the required volume of blow-down and makeup.

The blow-down/makeup process works well but suffers from several drawbacks. The blow-down water is concentrated and thereby solids laden. The disposal of such water can be a financial as well as environmental liability. Blow-down removes water from the cooling cycle. This volume must be replaced. The makeup water volume must accommodate both the evaporative loss and the additional blow-down loss. This volume of make up water may be expensive, not available, or can exact an unacceptable burden on the water supply. Generally, in order to save water and reduce disposal costs and liabilities, blow-down rates are maintained as low as is feasible without endangering the fill or other process equipment with scaling, fouling or plugging.

Several methods have been developed to minimize the fouling problems of fill. In applications where high solids content water is inevitable, splash bar type fill is usually chosen over film type fill. Splash bar fill is not as efficient as film type fill, but does have a lower proclivity towards fouling in the presence of high solids content water. Splash bar type fill can operate with a higher solids content than film type fill, but there is still a limit at which splash bar fills can successfully perform. Operation of splash bar fill over this limit results in solids buildup on the splash bars. Such a buildup exacts a penalty on air and water flows as well as the weight of the fouling material endangering the structural integrity of the fill and it's supporting members.

In situations where the level of solids in the water exceed acceptable levels for the employment of splash bar type fill, other methods have been tried. Spray fill systems, wherein relatively high pressure nozzles spray the high solids content water into an airstream, have been employed with some level of success. These systems require substantially more power because of the high pressures necessary to properly operate the droplet generating nozzles. These systems also are very prone to nozzle plugging and require substantial and continual maintenance efforts focused on keeping the nozzles clean. The spray nozzles also require frequent replacement as a consequence of entrained particulate erosion.

Other techniques, which are commonly used to assist in evaporative cooling applications employing cooling water with high concentrations of solids, involve chemical treatment or softening, by chemical or membrane filtration means, of the water to reduce its fouling tendencies. Nearly all industrial evaporative cooling applications incorporate some degree of chemical treatment of the water. Typically, these treatments provide biological control but often also include chemicals for the provision of fouling control. Chemical treatments run the range from simple pH control to sophisticated demineralization processes on the evaporating water and/or the makeup water.

Various configurations of rigid fills, both splash bar and film type, have been developed to operate at higher levels of solids without fouling. These have met with some success albeit they are still limited to a level of solids concentration over which they cannot operate. The goal of the invention is to provide a fill system which can operate at the maximum possible solids concentration. The ultimate requirements for such a fill system would be that it could operate in a crystallizing and precipitating mode. The water would be saturated with solids as it passed over the fill, with solids precipitating out of solution and forming a solid material. For a fill system to operate successfully under such conditions, the fill must possess two essential attributes; the first is that the precipitating solids cannot permanently adhere to the fill surfaces and the second, is that the fill system must be capable of discarding the generated solids to prevent plugging. Prior art shows no fill systems with these attributes.

Evaporative cooling is a primary source of industrial cooling. Water usage and waste water disposal are concerns of growing importance relating to evaporative cooling operations. Water usage and blow-down disposal volumes are directly related to the ability of evaporative cooling systems to operate with circulating water at higher concentrations of solids. Attempts have been made to develop technologies permitting operation of evaporative cooling systems at higher concentrations of solids. This prior art however suffers from several disadvantages:

(a) Fill designs capable of handling high solids laden circulating water are still limited to a critical solids concentration at which unacceptable fouling occurs. Operating with a saturated coolant water in a precipitating and crystallizing mode is not feasible. Solids precipitation and buildup result in water and air flow stoppage and channeling as well as structural failure of the fill system and/or supports as a consequence of the weight of the accumulated solids.

(b) Chemical treatments designed to reduce the fouling tendencies of the circulating water at high levels of solids concentration are expensive and often labor intensive due to the requirement for monitoring and chemical analysis. Chemical treatment processes require expensive instrumentation and dosage control equipment. Often a water treatment specials or chemist must be onsite or readily available to oversee sampling and treatment processes.

(c) Chemical treatments designed to reduce the fouling tendencies of circulating water at high levels of solids concentration often employ chemicals that are hazardous to personnel. Water treatment often employs dangerous biocides and chemicals that are very acidic or very caustic. Such chemicals present a real personnel hazard and generally require specialized training for the handling personnel.

(d) Chemical treatments designed to reduce the fouling tendencies of circulating water at high levels of solids concentration often employ chemicals that present environmental liabilities if spilled or are contained within the blow down waters. Effective chemical treatment often requires the maintenance of a continuous level of chemical in the circulating cooling water. With the large volume of circulating cooling water that is generally employed, spillage is inevitable. Also, most evaporative cooling systems employ blow down and makeup proceedings to maintain an acceptable solids concentration level in the circulating cooling water. The spillage and blow down waters contain the chemicals being maintained in the cooling circulating water. These chemicals are often hazardous and thereby present a substantial environmental risk when spilled or discharged.

(e) Chemical treatments designed to reduce the fouling tendencies of water at high levels of solids concentration are often corrosive and can damage equipment contacted by the circulating water. Chemical treatments often employ acidic or caustic chemicals which are prone to attack the metallic materials of construction of cooling systems. Expensive equipment such as pumps, heat exchangers and condensers are examples of equipment typically damaged by chemical treatment focused on preventing scaling, plugging or fouling.

(f) Chemical treatments designed to reduce the fouling tendencies of water at high levels of solids concentration often employ chemicals that present an environmental hazard when released to the atmosphere through drift or air stripping processes in the evaporator. Effective chemical treatment often requires the maintenance of a continuous level of chemical in the circulating cooling water. Also most evaporative cooling systems generate a level of circulating cooling water carryover to the atmosphere. This carryover water contains the chemicals being maintained in the cooling circulating water. These chemicals are often hazardous and thereby present a substantial environmental risk when discharged to the atmosphere.

(g) Processes designed to remove both suspended and dissolved solids from the evaporating water are capital and labor intensive. Technologies have been developed to remove the concentrating solids and solutes from the circulating water of evaporative cooling systems so as to reduce the scaling, fouling and plugging tendencies thereof Examples of these technologies are full and side stream filtration and softening. Said softening processes including chemical precipitation, ion exchange and membrane filtration. All of these technologies require qualified operating personnel and are expensive, from both an operating and capital standpoint.

(h) Waste products generated by the removal of solids from the evaporating water can be hazardous and present an expense and environmental liability for disposal. Chemical treatment, flushing and extraction techniques are often required with the technologies employed for the full or side stream extraction of concentrating solids and solutes. The residues of these chemicals as well as the extracted solids are often hazardous and must be disposed as a hazardous material. Such disposal is expensive and generally carries long term liability for the generator.

(i) Processes designed to remove solids from the makeup water are capital and often labor intensive. Said processes include chemical precipitation, ion exchange and membrane filtration. All of these technologies are sophisticated and require expensive and elaborate monitoring, metering and operating equipment. The corrosive nature of many of the process chemicals require equipment to be manufactured of exotic and expensive materials. In addition to the capital expense, the sophisticated and complicated nature of the processes often require qualified operating personnel. Such personnel, as well as the training required thereof, are expensive.

(j) Waste products generated by the removal of solids from the makeup water can be hazardous and present an expense and environmental liability for disposal. Treatment of the makeup water to an evaporative cooling system is often performed to reduce the solids content prior to blending with the concentrating, scaling, fouling or plugging circulating cooling water itself. Chemical treatment, flushing and extraction techniques are often required with the technologies employed for the full or side stream extraction of solids and solutes from the makeup water prior to entering the evaporative cooling system. The solid residues as well as the residues generated from chemical extraction processes required to remove the solids from the makeup water are often hazardous and must be disposed as a hazardous material. Such disposal is expensive and generally carries long term liability for the generator.

(k) Control of fouling and scaling by means of evaporative water blow down can present an expense and environmental liability for disposal of the blow down waters. Blow down waters contain both chemicals from treatment as well as concentrated solutes. Often either or both of these blow down constituents are hazardous and thereby present a substantial environmental risk when discharged to the environment.

(l) Control of fouling and scaling by means of evaporative water blow down requires a compensating amount of makeup water. In many situations quality makeup water is in limited supply. This additional makeup water presents a substantial expense or may not even be available.

(m) Additional concentrating processes are necessary for those applications in which solutes are a desirable product from the evaporating water. Prior art shows an inability to concentrate and/or precipitate such solutes from the evaporating water stream without inflicting fouling and scaling damage to the fill and fill support structures.

(n) The capital cost for additional concentrating processes necessary for those applications in which solutes are a desirable product from the evaporating water can be prohibitive. Such concentrating processes are essentially, sophisticated chemical treatment plants which employ expensive exotic materials and processes.

(o) The energy requirements for additional concentrating processes necessary for those applications in which solutes are a desirable product from the evaporating water can be prohibitive. The additional concentrating and precipitating processes of the prior art demonstrate a requirement for high grade energy. This high grade energy is consumed in the form of expensive and somewhat limited high temperature thermal energy and/or electricity.

Objects and Advantages

This invention relates to an evaporative fill or packing process which employs a flexible film or surface which, through flexing and induced motion, prohibits solids buildup and fouling. The advantages of the invention result primarily from the ability of the invention to provide operable evaporative surfaces in the presence of fouling, solids laden fluids.

The ability of the invention to maintain operable evaporative surfaces in the presence of highly fouling, solids laden water provides several objects and advantages over the prior art. Some of which are as follows:

(a) The invention provides effective evaporative surfaces independent of the solids or solutes concentration of the evaporating water. The invention provides the opportunity for evaporative processes to be employed without the constraint of specific solids or solutes concentration limits. The invention provides the means for evaporative processes to function successfully with saturated water solutions in which solids are circulating, precipitating and crystallizing from solution. The invention provides unlimited potential for applying evaporative processes to those solutions for which such processes would otherwise not be feasible because of fouling and scaling. This characteristic is a substantial advantage over the prior art in which evaporating water solutions must be monitored and maintained within the constraints of specific solids or solutes concentration levels.

(b) The invention can provide evaporative process service to scaling and fouling prone water solutions without the expense and labor associated with chemical treatment of the evaporating water. Expensive and labor intensive chemical treatment processes, which are normally employed by the prior art to minimize fouling and scaling tendencies, are unnecessary with the invention. Such elimination of chemical expense and labor is a substantial advantage over the prior art.

(c) The invention can provide evaporative service with scaling and fouling prone water solutions without the use of hazardous chemical treatments employed for control of the fouling tendencies of the evaporating water. Chemicals commonly used in the prior art to control the scaling and fouling tendencies of water are often hazardous to personnel. The invention provides evaporative service without the necessity of chemical treatment, thereby eliminating personnel hazards associated with the handling and use of said chemicals.

(d) The invention can provide evaporative service without the potential for spillage or discharge of environmentally hazardous chemicals. Such environmentally hazardous chemicals are often employed in the prior art for control of the scaling and fouling tendencies of the evaporating water. The invention provides a means to employ evaporative processes without the necessity for chemical treatment, thereby eliminating all environmental liabilities resulting from spillage or discharge of chemicals intended for controlling the scaling and fouling tendencies of the evaporating water.

(e) Corrosion and material degradation problems resulting from contact with chemicals intended for the control of scaling and fouling do not occur with the invention. In contrast to the prior art, the invention can provide evaporative service with fouling prone water solutions without the addition of chemicals employed for control of the scaling and fouling tendencies of the circulating water. Many of these chemicals are acidic, caustic or otherwise detrimental to materials in which they are in contact. The invention does not require chemical treatment of scaling and fouling prone evaporating water, consequently, corrosion and material degradation resulting from contact with such chemicals cannot occur.

(f) The invention can provide evaporative service without the potential for emission or discharging of any environmentally hazardous air pollutants. Chemicals which are volatile or prone to droplet carryover to the atmosphere are often employed in the prior art for control of the scaling and fouling tendencies of the evaporating water. These chemicals are environmentally hazardous when emitted or discharged as an air pollutant. The invention provides a means to employ evaporative processes without the necessity for chemical treatment, thereby eliminating all environmental liabilities resulting from the emission or discharge of chemicals into the atmosphere.

(g) The invention can provide evaporative service, without detriment, in the presence of solids. The invention does not require additional equipment or processes to facilitate functioning of the evaporative surfaces. Such additional equipment or processes are often employed in the prior art to extract solids from the evaporating water to prevent scaling, fouling or solids buildup from occurring on evaporative surfaces. Such equipment and processes are capital and labor intensive. The presence of these solids does not present a difficulty to the invention. Specialized equipment and processes to extract the solids are not required by the invention. As a consequence, capital and labor expenses associated with such equipment and processes are eliminated.

(h) The invention can provide evaporative service, without detriment, in the presence of solids. The invention does not require extraction of the solids, with the consequential problems of disposal thereof, to facilitate functioning of the evaporative surfaces. Extraction of solids, often necessary for evaporative processes of the prior art, generate a waste solid with the consequential requirement of disposal. These waste solids are often environmentally hazardous, particularly in those applications of the prior art in which chemical extraction processes are employed. The invention does not require extraction of the solids responsible for the scaling and fouling tendencies of the evaporating water. Therefore the expense and environmental liabilities associated with disposal of the extracted solids are eliminated.

(i) The invention can facilitate evaporative processes without consideration to the quality of makeup water. Processes and equipment employed in the prior art to extract solids from the makeup water to reduce the scaling and fouling tendencies of said water are capital and labor intensive. The invention does not require such equipment or processes, thereby eliminating the capital and labor expenses involved therein.

(j) The invention can facilitate evaporative processes without consideration to the quality of the makeup water. Processes and equipment are often employed in the prior art to extract solids from the makeup water to reduce the scaling and fouling tendencies of said water. Extraction of these solids generates a waste product with the consequential requirement of disposal. These waste solids are often environmentally hazardous, particularly in those applications of the prior art in which chemical extraction processes are employed. Since the quality of the makeup water is not of consequence to the invention, extraction of solids from the makeup water is not necessary. The invention thereby eliminates those expenses and liabilities which would be associated with the disposal of solids extracted from the makeup water.

(k) The invention can provide evaporative service without the need for blow down to control the solids content in the evaporating water. Blow down of the evaporating water is commonly practiced in the prior art. This blow down water and the solids entrained therein manifest a waste product with the consequential requirement of disposal. The blow down water and entrained solids are often environmentally hazardous with accordingly high disposal expenses and environmental liabilities. The invention can provide evaporative service, without detriment, in the presence of solids. Therefore, blow down to control solids levels and associated disposal expenses and environmental liabilities are eliminated.

(m) The invention can provide evaporative service with the minimal requirement for makeup water. The invention can provide evaporative service, without detriment, in the presence of solids. Therefore, blow down is not required to control the solids content in the evaporating water. Make up water for evaporative processes must compensate for water loss resulting from evaporation as well as water loss as a consequence of blow down. Since the invention does not require blow down, the makeup water volume to the evaporative process is minimized. This characteristic of the invention provides the opportunity to provide evaporative service with minimal makeup water expense as well as other associated difficulties in obtaining said water.

(n) The invention provides the ability to concentrate solutes to unlimited levels in a single evaporative step. For those evaporative processes in which concentration or harvesting of the solutes is the desired end, the invention requires no additional processes or equipment at the high solute concentrations. Prior art generally separates the concentrating and solidifying processes in such applications. The invention does not require such separation. This advantage provides savings in capital and operating expense as well as system complexity.

(o) The invention provides the ability to concentrate solutes to unlimited levels in a single evaporative step. For those evaporative processes in which concentration or harvesting of the solutes is the desired end, the invention requires no additional processes or equipment at high solute concentrations or solids precipitating levels. Prior art generally separates the concentrating and precipitating processes in such applications. The energy requirements for the additional processes necessary for applications in which solutes are a desirable product from the evaporating water can be prohibitively expensive. The additional concentrating and precipitating processes of the prior art demonstrate a requirement for high grade energy. The invention does not require additional equipment or processes for concentration or harvesting of solutes. Further, the energy consumption of evaporative processes employing the invention are essentially independent of the solutes concentration.

p) Low temperature, low grade energy sources are adequate for both the concentrating and precipitating phases of evaporative processes employing the invention. Low temperature energy sources are usually abundant and inexpensive in the form of waste heat. The capability of the invention to employ such thermal sources provides a strong economic advantage over the prior art.

DRAWING FIGURES

Reference FIG. 1 for a drawing of a preferred embodiment of the invention.

REFERENCE NUMERALS IN THE DRAWING

1 Water to be evaporated is distributed over a flexible membrane surface

2 An airstream is directed across the membrane surfaces

3 A membrane support structure

4 A flexible and undulating membrane

5 Evaporating water flow with precipitating solids

6 Concentrated water with precipitates and entrained solids exiting the flexing and undulating membrane 7 Solids mass collected as a discharge from the flexing and undulating membrane and as entrained in the concentrated water depicted as item 6

8 Substantially solids free concentrate conveyed to other process or for return to the flexing, undulating membrane for further evaporation and concentration 9 Humidified and/or cooled air to discharge or other process

BRIEF SUMMARY OF THE INVENTION

The intent of this patent is to describe a process and mechanism for the provision of air contacting evaporation of highly scaling, fouling and/or crystallizing aqueous solutions. The process incorporates direct contact between an airflow and a highly scaling and fouling water solution in the presence of an undulating, flexible membrane. This membrane provides the surfaces onto which the water solution is distributed. Airflow is conveyed across the wetted membrane, thereby furnishing the evaporative impetus for the water solution flowing thereon. Said airflow is provided at a sufficient velocity to enkindle wavelike undulations in the flexible membrane. The undulations afford a vacillating effect to the flexible membrane surface. This effect continuously, and in a substantially random fashion, modifies the water flow patterns on the membrane surfaces. The continuously shifting flow patterns assure total wetting of the membrane surfaces, thereby eliminating both the channeling tendencies of the flowing, evaporating water and preventing the creation of dry surface sites. The abolition of dry surface sites assures maximum availability of the evaporative surface area and averts the tendency for solids to accumulate at dry sites. The undulating motion also incites splashing activity which redistributes the water, thereby further minimizing channeling effects while also augmenting the contacting surface area between the air and evaporating water solution. Moreover, the undulations provide a mechanism for self cleaning of the membrane in the presence of accumulating solids. The size of solid masses developing, accumulating and adhering to the surface membranes is limited by the flexing and undulating motion of the membrane. The strain of flexing and the inertial effects of the undulating motion result in a stripping and pulling action of the solid masses away from the membranes. The solid masses are released from the membrane and free fall away from the membrane for collection and further use. The membrane remains functionally clean to provide continuously effective evaporative surfaces for the evaporative process.

Figure 1:
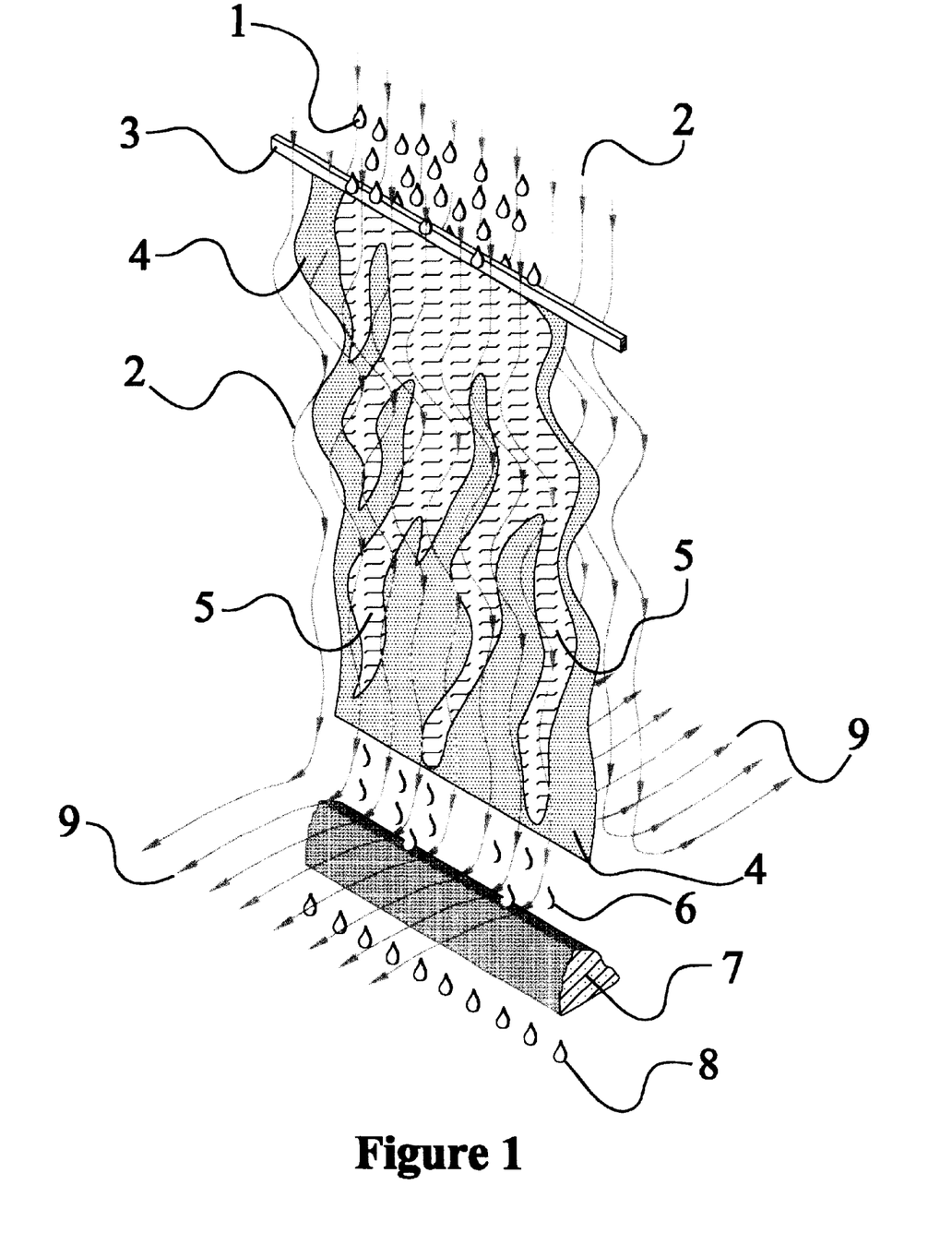

Description-FIG. 1

Direct to obtaining the described effects, a preferred embodiment of the invention is illustrated on FIG. 1 and is described in the following discussion. Water to be evaporated 1 is distributed over the upper section of a flexible membrane 4. Said membrane is maintained in a vertical plane by means of a structural support 3 clasping and securing the membrane 4 from an edge, which in this illustrated embodiment, is the singular top edge. Such a support configuration provides the membrane 4 with the laxity to move or sway in planes parallel to the axis of the structural support 3. Airflow 2 is apportioned across the membrane surfaces at a velocity sufficient to facilitate both the impetus for evaporation of the distributed water 1 and to promote swaying or wavelike undulation of the membrane 4. Evaporating water 5 flows across the undulating membrane surface in response to the coercion of both gravitational and aerodynamic forces. Evaporation concentrates the flowing water 5, affording the development of precipitates, crystals and agglomerating solids. A fraction of these solid materials temporarily adhere to the membrane surfaces while others remain entrained within the evaporating water 5 flowing across the membrane. The concentrated water with entrained solids 6 exits the membrane surface and gathers in a collection and solids separation site 7. That portion of precipitates, crystals and agglomerated solids which have evolved from the concentrating water 5 and adhered to the membrane 4, grow until reaching a size at which they separate from the membrane surfaces and fall to the collection site 7. The mechanism for said separation being the differential flexing and inertial separation brought about by the undulating motion of the membrane 4. Solids collected in the collection site 7 are separated, for other process use or disposal, from the entraining water by existing and typical means for this task such as screens, filters, hydrocyclones etc. The essentially solids free concentrate 8, is then available for other process use, disposal or for further treatment in the subject evaporative process. After availing itself to the provision of evaporative service and the incitement of undulating motion to the membrane 4, the airflow 9 is directed away from the membrane 4 for other process use or disposal.

Conclusion, Ramifications, and Scope

The reader will see that the invention provides a process for air contact evaporation of highly fouling, scaling and/or crystallizing water solutions. The advantages over the prior art are substantial in that a simple and reliable evaporative surface is provided without any constraints as to the evaporating water quality or constituents. The reader will also see that other advantages are inherent to the unique capabilities provided by the invention. Some of these additional advantages are:

The evaporative surfaces provided by the invention are self cleaning and not susceptible to organic or biological growth. The invention can provide evaporation and aeration service to solutions which are prone to biological fouling without contagion or fouling by organic materials.

The self cleaning proclivity of the invention prevents a buildup of solid residues. Such residues normally have the potential for being very heavy. The self cleaning nature of the evaporative surfaces eliminates the menace imposed by a buildup of solids. Accordingly, a factor of safety which would normally be imposed upon the evaporative surface supports of the prior art can be substantially reduced through the employ of the invention. The risk of heavy solids buildup and requisite structural support rigor and associated cost is eliminated.

The proficiency of the invention to readily evaporate solutions containing highly scaling, fouling and precipitating solids provides the opportunity to employ waste water for cooling service. Such use would benefit in delivering cooling service without environmental discharge as well as providing an environmentally attractive and cost effective means for waste water disposal.

The invention affords the provision of evaporative service without the necessity for blow down, makeup volumes corresponding to the blow down volumes, filtration, descaling and other related water treatment operations. The equipment and instrumentation expenses and personnel concerns associated with such water treatment processes are thereby eliminated.

The invention facilitates the unique capability to employ low quality, otherwise unusable, waters in the provision of evaporative processes such as cooling, humidification, fogging etc. This capability is a benefit both in the economic sense as well as in providing an environmentally attractive end use to such low quality waters.

The invention can provide evaporative process service without the economic and environmental burden resulting from the blow down of solids laden waste water and the corresponding consumption of makeup water. Such benefits allay the liabilities associated with environmental discharge as well as providing a means for saving quality water resources.

The invention affords an evaporative process wherein poor quality waters may be employed without the expense and hazards associated with chemical treatment processes. The equipment and instrumentation expenses and personnel concerns associated with such chemical treatment processes are eliminated.

The invention offers a simple air contacting evaporative technology for the provision of crystallization, solidification and harvesting of useful solutes from plugging fouling or scaling solutions. Air contact evaporation can provide a low temperature method for solute extraction. The low process temperature enables the employment of inexpensive waste heat as well as permitting thermal evaporative extraction of temperature sensitive solutes.

While the foregoing discussions specify the many advantages inherent to the invention these do not constitute the full scope of the inventions advantages. There are many advantages beyond those defined herein. In a similar manner the embodiment described in the foregoing and illustrated as FIG. 1 is also not the only embodiment possible. Other embodiments are possible.

An embodiment wherein the water 1 to be evaporated or aerated is distributed on the membrane 4 from any direction other than the top could easily and successfully be employed. Also, the water 1 could be distributed in a batch type fashion so as to enable drying or other effects. Distribution of the water 1 by conveyance in the airstream 2 is also a possible and acceptable embodiment. A distribution of water 1 upon the membrane 4 surface could also easily be achieved through a dipping or emersion process of the membrane 4. In such an embodiment, the membrane 4 would be wetted by means of the total or partial dipping or emersion of the membrane 4 in the water to be evaporated 1. This embodiment could be implemented through the physical dipping of the membrane 4 in a bath of the water 1 to be evaporated or by the inundation and subsequent submersion of the membrane 4 by the water to be evaporated 1 in a containment about the membrane 4.

An embodiment in which the airflow 2 is directed to contact the membrane 4 in a direction other than from the top is possible and acceptable. The airflow 2 may also be varied in direction, intensity and/or velocity in a random or somewhat cyclical fashion so as to enhance or further facilitate the undulation of the membrane 4. Such variations could be employed in this embodiment so as to enhance or otherwise control the water 1 distribution or flow patterns 5 on the membrane 4 surfaces. The airflow 2 variations of such an embodiment could also be employed in a random, cyclical or continuous fashion so as to accelerate or enhance the self cleaning nature of the membrane 4. An embodiment of which the airflow 2 is preheated, dehydrated or chemically treated prior to contact with the evaporating water 1, 5 or membrane 4 could be employed for the purpose of accelerating, drying or otherwise governing the evaporation or process rates of the water 1, 5 on the membrane 4.

Embodiments in which the membrane 4 is supported in a manner differing from the membrane support mechanism 3 as illustrated on FIG. 1 are possible. Support of the membrane 4 by means other than a clasping bar type of structure can be readily and successfully employed. The preferred embodiment as illustrated in FIG. 1 provides for a membrane support structure 3 anchoring the singular top edge of the membrane 4. Other support embodiments anchoring multiple or other edges are possible. Such embodiments being bridled only by the flexible nature of the membrane 4 as well as the air 2 and water flow 1, 5 dynamics of the application. In fact, any membrane structural support 3 embodiment may be employed so long as the undulating, self cleaning motion of the membrane 4 is not overtly constrained and that the water 1, 5 and airflow 2, 9 effectiveness is not encumbered.

There are many possible embodiments and configurations of membrane 4. The single primary consideration being given to sufficient flexibility and geometry to afford the undulating and self cleaning nature therein. Embodiments in which the surface texture of the membrane 4 is specified so as to be more or less adhesive can be devised for the provision of solids characterization or to promote the self cleaning action of the membrane 4. Embodiments in which the undulating characteristics of the membrane 4 are modulated by means of the membrane material thickness, stiffness or other physical characteristics are possible. Embodiments in which mechanical means such as of batons, weights or edge supports can be incorporated into or attached to the membrane 4 so as to modulate the undulations of the membrane 4 are possible. Membrane 4 embodiments of which the surface texture presents a plurality of ridges, holes, bumps or other such surface topography could be employed to enhance splashing effects or the surface area generating characteristics of the water 5 passing over said surface are possible. The membrane 4 can be manufactured of many different materials with the primary objective being that the material be sufficiently pliant to afford the undulating effect while being durable enough for long operating life. Embodiments in which the membrane 4 is strengthened by the inclusion of mechanical reinforcements of the categories represented by, but not limited to, threads, fibers, wires, cables, screens, rods, plates, or cloth are practical and could be employed. Embodiments in which the membrane 4 material is chemically, thermally, mechanically or otherwise treated or altered so as to enhance rigidity, strength, mechanical properties, thermal or chemical resistance at all or specific locales on the membrane could be readily employed.

The water 5 advancing on the membrane 4, could be moderated so as to provide specific effects. An example of such an embodiment would be the application of certain chemicals at specific locations to control developing pH, solids precipitation or other characteristics of the advancing water 5. In such an embodiment catalyzing chemicals could be imbedded in the membrane surface or a site specific spray distributor could be employed. Embodiments in which other processes such as locally focused sound waves, electromagnetic waves or thermal transferance could also be engendered for effect at specific sites of the advancing water 5 on the membrane 4.

Discharge of the aerated and concentrated water 6 from the membrane can be brought about through various means. In the preferred embodiment the discharge water 6 simply drips from the bottom edge of the membrane 4. Embodiments in which the water 6 is discharged from other edges of the membrane 4 brought about by airflow 2, 9 or other driving factors are possible.

The preferred embodiment of FIG. 1 illustrated that a water concentrate 6 entrained with solids would be discharged from the membrane 4. Other embodiments are entirely possible wherein the discharged water 6 is only an aerated or concentrated water containing no entrained solids. It is also possible that an embodiment of the invention could be employed in which only solids are discharged from the membrane 4. In such an embodiment, full drying would occur on the membrane 4 surface with the resulting dry solids peeling from the membrane 4 surfaces for discharge 6 and collection 7. Embodiments in which collection tubing or other devices are incorporated into the membrane 4 edges for collection of the discharge waters 6 are possible. The collection devices of such an embodiment could also provide benefit as membrane structural supports 3 or membrane 4 undulation control devices.

The collection site 7 for solids in the preferred embodiment, as illustrated on FIG. 1, is located below the lower edge of the membrane 4. Embodiments for which the collection site 7 are located elsewhere are entirely within the scope of the invention. Collection sites 7 corresponding to embodiments in which the liquid discharge 6 occurs at membrane 4 edges other than the lower edge are possible. Collection sites 7 outside the ambit of the invention are also possible. In an embodiment such as this, the liquid 6 and any solids entrained therein would be conveyed via piping, sloped flooring, duct work or other such transport mechanism to a remote collection site 7. Multiple collection points 6 are also within the scope of the invention. Embodiments which employ multiple collection points 6 for different products are possible. Such a useful embodiment could be employed to collect liquid entrained solids 7 from an edge site and solids which develop in adherence to the membrane 4 but which peel as a consequence of the undulations of the membrane 4 from a bottom site. The functioning of such an embodiment could result from airflow 2, 9 patterns or velocities being sufficient to drive the advancing water 5 toward the leeward edge of the membrane 4 but not being sufficient to divert, from an essentially vertical fall, the heavy solid masses which are peeling from the membrane 4. As discussed previously, the peeling action being as a consequence of the accumulated mass of the solids and undulating action of the membrane 4. Such vertical fall would provide for collection 7 of the adhering solids below the membrane 4 while the liquid with entrained solids 6 would be collected 7 at the leeward edge of the membrane 4. Embodiments in which solids collection 7 does not occur at all are possible. Such an embodiment would be one in which the discharged water 6 contains no entrained solids or solutes for collection. A liquid concentrating application would be an example of such an embodiment. Another example of such an embodiment would be those total drying applications where there is no discharge of liquid 6 from membrane 4. In such an example, solids generated from the total evaporation of the advancing water 5 would flake, peel or otherwise separate from the membrane 4 and be carried away by the airflow 2, 9.

Essentially solids free water 8 may be separated in a plurality of manner from the collection site 7. In the preferred embodiment illustrated as FIG. 1, the water 8 simply drained from the solids mass at the collection site 7. Alternate methods for separation of the water 8 from the collected mass 7 abound. Processes exemplified by, but not limited to filtration, screening, cyclonic separators and settling tanks with the water 8 generated as filtrate represent various acceptable embodiments.

The discharged airflow 9 may emanate at a multitude of locations from the invention. In the preferred embodiment, as illustrated on FIG. 1, the airflow 2 is directed downward, concurrent with the water flow 5 with discharge 9 emanating from the locale of the lower edge of the membrane 4. Embodiments in which the airflow 2 is counter current and transverse to the water flow 5 are possible. In fact, from a heat and mass transfer basis, air 2 flowing countercurrent relative to the water flow 5 is superior. In the preferred embodiment however, air 2 flowing in the upward direction requires the complications of a membrane 4 support 3 being at both the top and bottom edges of the membrane 4 or the inclusion of a weighting mechanism or mass attached to the lower edge of the membrane 4. Such support or weighting is necessary so as to prohibit lifting of the membrane 4 thereby assuring proper passage of both air 2 and water 5 as well as providing the appropriate conditions necessary for effective undulation of the membrane 4.

The preferred embodiment portrayed in FIG. 1 evinces one membrane 4. Such an embodiment with a single membrane 4 was presented for illustrative clarity. Actual applications would preferentially employ multiples of the membrane system configurations as defined in FIG. 1. An embodiment incorporating an array of the configurations of FIG. 1 would be most practical. Embodiments comprising one or more membranes configured in a non planar or semi-planar fashion is also practical, An example of such an embodiment would be the implementation of the membranes 4 in a cylindrical fashion wherein the membranes 4 are configured as a series of concentric cylinders. In such a configuration the air 2, and water 5 bulk flow regimes would be parallel to the axis of the cylindrically configured membranes 4. There are many other embodiments possible wherein the membranes 4 are configured in various manners. A primary operating constraint on these other configurations being that the membrane 4 be assured sufficient laxity for adequate undulating motion.

In the foregoing discussions, impetus for aeration and evaporation as well as the primary driving factor for undulation of the membrane 4 is the airflow 2, 9 across the membrane. Other embodiments are possible wherein an alternate gas, other than air, is employed in flow 2, 9 across the membrane 4. Another embodiment is possible wherein either a mixture or cycling of said alternate gas and air are employed in the flow 2, 9 across the membrane 4. Also the reader will note that the liquid being introduced 1, and flowing 5 across the surface of the undulating membrane 4 has been described as a water based solution. Embodiments in which an alternate fluid other than a water based fluid is induced to flow 1, 5 on the undulating membrane 4 surface are possible. In a like fashion, embodiments are possible wherein either a mixture or a cycling of said alternate fluid and a water based fluid are induced to flow as 1, 5 upon the undulating membrane surface 4.

The reader will note that in the foregoing discussions it is implied that the primary impetus to bring about undulation of the membrane 4 is the air flow 2, 9. In the illustration of the preferred embodiment, FIG. 1, the reader can descry the obvious simplicity of such an approach. Other embodiments however are possible wherein undulation of the membrane 4 is brought about through different means. Embodiments in which the water is introduced or distributed 1 upon the membrane surface 4 in a varying or cyclical fashion so as to induce membrane 4 undulations are possible. Another possible embodiment to induce undulation of the membrane 4 is mechanical shaking, moving or vibrating of the membrane support 3. Embodiments which exploit one or more of the foregoing described methods to induce membrane 4 undulation are also possible.

What is claimed is:

1. An evaporative process for cooling a liquid solution on an evaporative surface of an undulating flexible membrane, the steps comprising:
    suspending the flexible membrane for affording an undulating motion;
    creating a wavelike undulating motion on the flexible membrane;
    introducing a gas stream across the evaporative surface of the undulating flexible membrane;
    introducing the liquid solution across the evaporative surface of the undulating flexible membrane;
    contacting the gas stream with the liquid solution on the evaporative surface of the undulating flexible membrane;
    cooling the liquid solution by means of the evaporative effect of the gas stream contacting the liquid solution on the evaporative surface of the undulating flexible membrane; and
    removing the cooled liquid solution from the evaporative surface of the undulating flexible membrane.

2. The process as described in claim 1 further including the step of adjusting the temperature of the gas stream prior to introducing the gas stream across the evaporative surface of the undulating flexible membrane.

3. The process as described in claim 1 further including the step of removing a liquid solution vapor enhanced gas stream from the evaporative surface of the undulating flexible membrane for further use after contacting the gas stream with the liquid solution on the evaporative surface of the undulating flexible membrane.

4. The process as described in claim 1 further including the step of adjusting the liquid solution temperature of the liquid solution prior to introducing the liquid solution across the evaporative surface of the undulating flexible membrane.

5. The process as described in claim 1 further including the step of removing the cooled liquid solution from the evaporative surface of the undulating flexible membrane for further use and after concentrating the liquid solution and depositing solids from the liquid solution on the evaporative surface of the undulating flexible membrane.

6. The process as described in claim 1 further including the step of introducing the cooled liquid solution back onto the evaporative surface of the undulating flexible membrane.

7. The process as described in claim 1 further including the step of introducing the cooled liquid solution back onto evaporative surfaces of additional undulating flexible membranes.

8. An evaporative process for concentrating a liquid solution on an evaporative surface of an undulating flexible membrane, the steps comprising:
    suspending the flexible membrane for affording an undulating motion;
    creating a wavelike undulating motion on the flexible membrane;
    introducing a gas stream across the evaporative surface of the undulating flexible membrane;
    introducing the liquid solution across the evaporative surface of the undulating flexible membrane;
    contacting the gas stream with the liquid solution on the evaporative surface of the undulating flexible membrane;
    concentrating the liquid solution by means of the evaporative effect of the gas stream contacting the liquid solution on the evaporative surface of the undulating flexible membrane; and removing the concentrated liquid solution from the evaporative surface of the undulating flexible membrane.

9. The process as described in claim 8 further including the step of adjusting the temperature of the gas stream prior to introducing the gas stream across the evaporative surface of the undulating flexible membrane.

10. The process as described in claim 8 further including the step of removing a liquid solution vapor enhanced gas stream from the undulating flexible membrane for further use after contacting the gas stream with the liquid solution on the evaporative surface of the undulating flexible membrane.

11. The process as described in claim 8 further including the step of adjusting the liquid solution temperature of the liquid solution prior to introducing the liquid solution across the evaporative surface of the undulating flexible membrane.

12. The process as described in claim 8 further including the step of removing the concentrated liquid solution from the evaporative surface of the undulating flexible membrane for further use and precipitated solids from the liquid solution have deposited on the evaporative surface of the undulating flexible membrane.

13. The process as described in claim 8 further including the step of introducing the concentrated liquid solution back onto the evaporative surface of the undulating flexible membrane.

14. The process as described in claim 8 further including the step of introducing the concentrated liquid solution onto evaporative surfaces of additional undulating flexible membranes.

15. An evaporative process for removing solids from a liquid solution on an evaporative surface of an undulating flexible membrane, the steps comprising:

suspending the flexible membrane for affording an undulating motion;

creating a wavelike undulating motion on the flexible membrane;

introducing a gas stream across the evaporative surface of the undulating flexible membrane;

introducing the liquid solution across the evaporative surface of the undulating flexible membrane;

contacting the gas stream with the liquid solution on the evaporative surface of the undulating flexible membrane;

generating and collecting solids on the evaporative surface of the undulating flexible membrane resulting from the evaporative removal of a liquid phase from the liquid solution; and removing the solids from the evaporative surface of the undulating flexible membrane.

16. The process as described in claim 15 further including the step of adjusting the temperature of the gas stream prior to introducing the gas stream across the evaporative surface of the undulating flexible membrane.

17. The process as described in claim 15 further including the step of removing a liquid solution vapor enhanced gas from the evaporative surface of the undulating flexible membrane for further use after contacting the gas stream with the liquid solution on the evaporative surface of the undulating flexible membrane.

18. The process as described in claim 15 further including the step of adjusting the liquid solution temperature of the liquid solution prior to introducing the liquid solution across the evaporative surface of the undulating flexible membrane.

19. The process as described in claim 15 further including the step of removing the solids from the evaporative surface of the undulating flexible membrane for further use.

20. The process as described in claim 15 further including the step of introducing the liquid solution back on the evaporative surface of the undulating flexible membrane.

21. The process as described in claim 15 further including the step of introducing the liquid solution onto evaporative surfaces of additional undulating flexible membranes.

* * * * *